(12) United States Patent
Browne et al.

(10) Patent No.: US 8,282,153 B2
(45) Date of Patent: Oct. 9, 2012

(54) ACTIVE MATERIAL BASED SEAM CONCEALMENT DEVICE

(75) Inventors: Alan L. Browne, Grosse Pointe, MI (US); Ukpai I. Ukpai, West Bloomfield, MI (US); Mark A. Kramarczyk, Sterling Heights, MI (US); Nancy L. Johnson, Northville, MI (US); Gary L. Jones, Farmington Hills, MI (US); John C. Ulicny, Oxford, MI (US)

(73) Assignee: GM Global Technology Operations LLC, Detroit, MI (US)

(*) Notice: Subject to any disclaimer, the term of this patent is extended or adjusted under 35 U.S.C. 154(b) by 838 days.

(21) Appl. No.: 12/116,371

(22) Filed: May 7, 2008

(65) Prior Publication Data

US 2009/0061188 A1    Mar. 5, 2009

Related U.S. Application Data

(63) Continuation-in-part of application No. 11/848,488, filed on Aug. 31, 2007, now Pat. No. 7,905,538.

(51) Int. Cl.
*B60J 10/08* (2006.01)
(52) U.S. Cl. ..................................... 296/146.9
(58) Field of Classification Search ............... 296/146.9, 296/180.5, 180.1; 280/728.3; 156/245, 304.6
See application file for complete search history.

(56) References Cited

U.S. PATENT DOCUMENTS

| | | | | | |
|---|---|---|---|---|---|
| 2,184,798 | A | * | 12/1939 | Gracey | 296/91 |
| 3,816,774 | A | * | 6/1974 | Ohnuki et al. | 310/332 |
| 5,454,619 | A | * | 10/1995 | Haraway, Jr. | 296/180.1 |
| 5,558,304 | A | * | 9/1996 | Adams | 244/134 A |
| 5,632,841 | A | * | 5/1997 | Hellbaum et al. | 156/245 |
| 6,175,989 | B1 | * | 1/2001 | Carpenter et al. | 16/225 |
| 6,772,479 | B2 | * | 8/2004 | Hinkley et al. | 16/225 |
| 6,910,714 | B2 | * | 6/2005 | Browne et al. | 280/753 |
| 6,979,050 | B2 | | 12/2005 | Browne et al. | |
| 7,118,652 | B2 | | 10/2006 | McKnight et al. | |
| 7,252,313 | B2 | * | 8/2007 | Browne et al. | 293/128 |
| 7,284,786 | B2 | * | 10/2007 | Browne et al. | 296/181.1 |
| 7,429,074 | B2 | * | 9/2008 | McKnight et al. | 296/180.1 |

(Continued)

OTHER PUBLICATIONS

Lampinen, Megan, Internet Web Article entitled "US: Researchers develop 'magnetic shape-memory foams'" AutomotiveWorld.com, dated Jan. 2, 2008; Source: http://www.automotiveworld.com/ACM/print.asp?contentid=65560; pp. 1-2.

(Continued)

*Primary Examiner* — Kiran B Patel
(74) *Attorney, Agent, or Firm* — Cantor Colburn LLP (57) ABSTRACT

A device for concealing a seam between a first and second surface includes a seam concealment body having a body surface, the body overlaying and attached to a first surface and a second surface, the body surface being substantially coplanar with a portion of the first and second surfaces, the seam concealment body configured to transition between a first shape and a second shape, wherein the transition permits movement of one or both of the first surface and the second surface such that the seam concealment body forms a hinge. The device also includes an active material in operative communication with the seam concealment body, wherein the active material is configured to undergo a change in at least one property upon receipt of an activation signal, wherein the change in at least one property is effective to transition the seam body from the first shape to the second shape.

8 Claims, 2 Drawing Sheets

U.S. PATENT DOCUMENTS

| | | | |
|---|---|---|---|
| 7,448,678 B2* | 11/2008 | Browne et al. | 297/216.12 |
| 7,500,704 B2* | 3/2009 | Herrera et al. | 296/37.12 |
| 7,594,697 B2* | 9/2009 | Browne et al. | 297/216.12 |
| 7,703,839 B2* | 4/2010 | McKnight et al. | 296/180.5 |
| 7,758,121 B2* | 7/2010 | Browne et al. | 297/284.11 |
| 7,854,467 B2* | 12/2010 | McKnight et al. | 296/180.1 |
| 7,905,538 B2* | 3/2011 | Ukpai et al. | 296/146.9 |
| 2005/0198907 A1* | 9/2005 | McKnight et al. | 49/475.1 |
| 2006/0012191 A1 | 1/2006 | Brei et al. | |
| 2006/0186700 A1 | 8/2006 | Browne et al. | |
| 2007/0071575 A1 | 3/2007 | Rudduck et al. | |
| 2008/0302024 A1* | 12/2008 | Browne et al. | 52/1 |
| 2009/0020188 A1* | 1/2009 | Ulicny et al. | 148/402 |
| 2009/0047197 A1* | 2/2009 | Browne et al. | 422/307 |
| 2009/0061188 A1* | 3/2009 | Browne et al. | 428/217 |
| 2009/0299502 A1* | 12/2009 | Mankame et al. | 700/68 |
| 2010/0019541 A1* | 1/2010 | Browne et al. | 296/202 |
| 2010/0138002 A1* | 6/2010 | Mankame et al. | 700/19 |
| 2010/0295653 A1* | 11/2010 | Pinto et al. | 337/126 |
| 2011/0089708 A1* | 4/2011 | Mankame et al. | 294/86.4 |

OTHER PUBLICATIONS

Chinese Office Action issued Aug. 11, 2010.

* cited by examiner

ACTIVE MATERIAL BASED SEAM CONCEALMENT DEVICE

CROSS REFERENCE TO RELATED APPLICATION

This application is a continuation-in-part of and claims benefit to U.S. Non-provisional patent application Ser. No. 11/848,488, filed Aug. 31, 2007, which is fully incorporated herein by reference.

BACKGROUND

The present disclosure generally relates to concealment devices for covering and/or filling the seams found between two surfaces of a vehicle, and in particular seam concealment devices having active materials.

Motor vehicles and other transportation means such as airplanes, busses, and trains have multiple movable (i.e., swingable, slidable, or the like) surfaces. In motor vehicles, for instance, such movable surfaces can include body panels, such as doors, hoods, trunks, tailgates, sunroofs, glove boxes, windows and the like. Currently, a seam (i.e. gap or opening) exists between the moveable surface, such as a sliding sunroof, and a non-movable surface, such as the vehicle roof. This seam can be partly attributed to the limited manufacturing tolerances of the panels, as well as gaps needed for operational purposes. Currently, the seams impact vehicle aerodynamics, as well as styling design and aesthetics.

BRIEF SUMMARY

Disclosed herein is an active material based concealment assembly in accordance with an exemplary embodiment. In one embodiment, a device for concealing a seam between a first surface and a second surface includes a seam concealment body having a body surface, the seam concealment body overlaying and attached to a first surface and a second surface, the body surface being substantially co-planar with a portion of the first surface and a portion of the second surface, the seam concealment body configured to transition between a first shape and a second shape, wherein the transition between the first and the second shape permits movement of a selected one or both of the first surface and the second surface such that the seam concealment body forms a hinge. The device also includes an active material in operative communication with the seam concealment body, wherein the active material is configured to undergo a change in at least one property upon receipt of an activation signal, wherein the change in at least one property is effective to transition the seam body from the first shape to the second shape.

In another embodiment, a device for concealing a seam between a first surface and a second surface includes a seam covering/concealing body, wherein the seam covering/concealing body comprises at least an active material, fixedly attached to a selected one or both of a first surface and a second surface. The active material portion of the seam covering/concealing body is configured to transition, when activated or deactivated, between a first stiffness and a second stiffness. The transition between a first stiffness and a second stiffness permits movement of a selected one or both of the first surface and the second surface. The active material portion of the seam body deforms maintaining the seam body's coverage/concealment of the seam/gap between the two surfaces, either acting directly as a hinge or serving as a cover for a hinge.

A method of concealing a seam between a first surface and a second surface, the method includes positioning a seam concealment body between the first surface and the second surface, wherein the seam concealment body comprises an active material, wherein the active material is configured to transition between a first stiffness and a second stiffness upon receipt of an activation signal, wherein the transition permits movement of a selected one or both of the first surface and the second surface such that the seam concealment body deforms with the movement of the surface to maintain concealment of the seam, activating the active material with the activation signal to change from the first stiffness to the second stiffness, and moving a selected one or both of the first surface and the second surface from a first position to a second position.

BRIEF DESCRIPTION OF THE DRAWINGS

Referring now to the figures, which are exemplary embodiments and wherein like elements are numbered alike:

FIG. 1 is a perspective view of an active material based concealment device with (a) first shape, and (b) second shape;

FIG. 2 is a perspective view of an active material based concealment device with (a) first stiffness, and (b) second stiffness;

FIG. 3 is a perspective view of yet another exemplary embodiment of an active material based concealment device with (a) first stiffness, and (b) second stiffness.

DETAILED DESCRIPTION

Figure 1A:
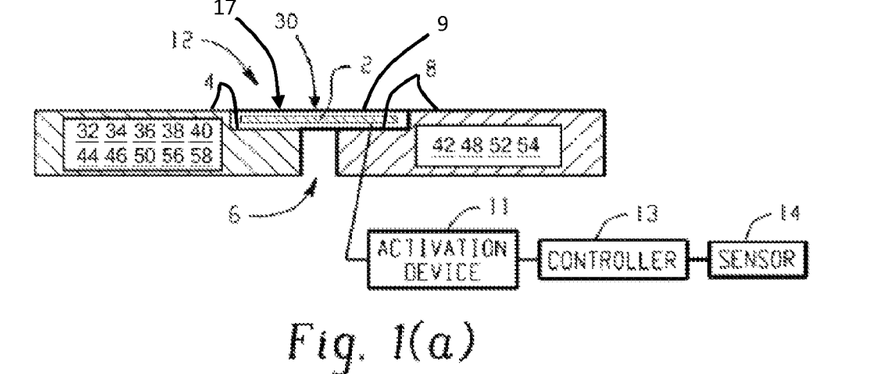
Figure 1B:
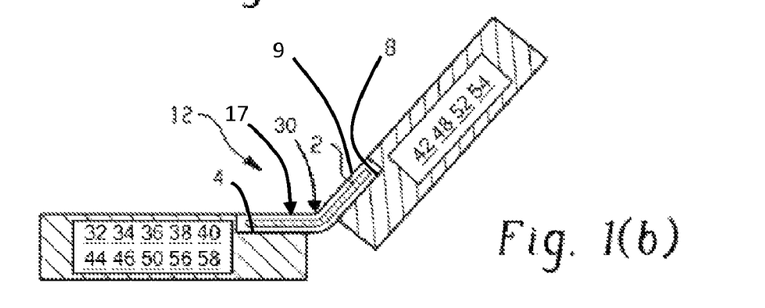

Referring to the Figures, and more particularly FIGS. 1a and 1b, concealment devices for covering and/or filling seams between vehicle surfaces and methods of their use are described herein. Further, the seam concealment devices as disclosed herein advantageously employ the use of active materials. The seam concealment devices comprise one or more active materials which permit the concealment devices to reversibly change shape and/or stiffness within a seam between vehicle surfaces, in response to a change in a property of the active materials upon receipt of an activation signal. The term "surfaces" as used herein generally refers to any surfaces of a vehicle (interior or exterior) that come together to form a seam (i.e., gap, opening, space, and the like) for which concealment is desirable. Referring, for example, without limitation, to FIGS. 1a and 1b where a door panel 32, trunk lid 34, hood 36, window 38, or tailgate 40 meets the vehicle body 42. In another example, where a sunroof 44, moonroof 46, or the like, meets the vehicle roof 48. In yet another example, where a glove box 50 and dashboard 52 come together or other such interior compartment 54 abutting surfaces that form seams, such as a center console 56, a storage compartment 58, such as for a cup holder, map storage, or media storage, and the like. The term "active material" as used herein generally refers to a material that exhibits a reversible change in at least one property such as dimension, shape, phase, orientation, stiffness, and the like upon application of an activation signal. Suitable active materials include, without limitation, shape memory polymers (SMP), shape memory alloys (SMA), ferromagnetic shape memory alloys (MSMA), electroactive polymers (EAP), magnetorheological (MR) elastomers, and the like. Depending on the particular active material, the activation signal can take the form of, without limitation, an electric current, an electric field (voltage), a temperature change, a magnetic field, a mechanical loading or stressing, and the like.

Also, as used herein, the terms "first", "second", and the like do not denote any order or importance, but rather are used to distinguish one element from another, and the terms "the", "a", and "an" do not denote a limitation of quantity, but rather denote the presence of at least one of the referenced item. The modifier "about" used in connection with a quantity is inclusive of the stated value and has the meaning dictated by the context (e.g., includes the degree of error associated with measurement of the particular quantity). Furthermore, all ranges disclosed herein are inclusive of the endpoints and independently combinable.

The change in "shape" as used herein generally refers to either a deformation such as bending or a change in dimensions of the seam concealing device. The change in "stiffness" as used herein generally refers, without limitation, to a change in flexibility, rigidity, compactness, elasticity, firmness, hardness, density, springiness, stretchiness, malleability, etc., of the seam concealing device. The terms "movement", "attempted movement", or "transition" include, without limitation, reference to a displacement or deformation resulting from a force exerted when a surface is pressed, pulled, compressed, twisted, or the like.

In one embodiment, a seam concealing body is disposed within or overlaying a seam between a first surface and a second surface. The body can be fixedly attached to the first surface or the second surface. In an alternative embodiment, the seam concealment body can be attached to both a first and second surface. The seam concealing body is configured to transition between a first shape and a second shape, such that the seam body deforms maintaining its coverage/concealment of the seam/gap between the two surfaces. The deformation of the seam concealing body permits movement of a selected one or both of the surfaces.

In an exemplary variation of this embodiment, an active material is in operative communication with the seam body, wherein the active material is configured to undergo a change in at least one property upon receipt of an activation signal, wherein the change in at least one property is effective to transition the seam body from the first shape to the second shape. In one embodiment, the seam concealing body comprises active material. In a further exemplary embodiment, the active material is shape memory alloy (SMA) wire. When one or both surfaces is rotated or moved away from its original position, the seam concealment body is deformed, stretching the SMA wire while in its low modulus room temperature state. The wires are heated upon the return of one or both surfaces to its original position. The SMA wire is thereby straightened to its original first shorter length, and the seam concealing body is restored to the position concealing the seam. In another exemplary embodiment, the seam concealing body comprises strips of active materials embedded in the seam concealment body. The embedded active material can be any material capable of changing shape from a first shape to a second shape and suitable for either deforming the seam concealment device to allow ease of movement of one or both surfaces upon application of the appropriate external field (normal state field off) or restoring the seam concealment device to its original shape upon return of the surfaces to their original position (normal state—field on). Exemplary materials include, but are not meant to be limited to, piezopolymers, electroactive polymers (EAPs), and magnetorheological elastomer.

In another embodiment, a seam concealing body is disposed within a seam between a first surface and a second surface. The body can be fixedly attached to the first surface or the second surface. In an alternative embodiment, the seam concealment body can be attached to both a first and second surface. The seam concealing body is configured to transition between a first stiffness and a second stiffness, such that the seam body deforms maintaining its coverage/concealment of the seam/gap between the two surfaces when one or both of the surfaces are moved. The change in stiffness of the seam concealing body permits movement of a selected one or both of the surfaces.

In one example of this embodiment, the seam concealment body itself is an active material. The body is disposed in the seam existing between the two surfaces and is fixedly attached to one or both of the surfaces. In one exemplary embodiment, the active material is a shape memory polymer. The hinge-like shape memory polymer is heated to soften, allowing movement (e.g., rotation) of one or both surfaces at the seam. As one or both surfaces is returned to its original position, the seam concealment body can be cooled and its original stiffness restored. In an exemplary application of this embodiment, the seam concealment body is positioned in a seam between two door panels of a vehicle. Upon heating, the shape memory polymer seam concealment body softens, allowing for movement of one or both of the door panels where the seam concealment device can bend/flex with the movement of the panels in the reduced stiffness state. After the panel(s) is/are returned to their original position, i.e., upon closing of a door, the seam concealment body is cooled and returned to its original stiffness. The active material employed for the seam concealment body can be any material whose stiffness would change upon heating and cooling. In an exemplary embodiment, the active material is a shape memory polymer. In a second exemplary embodiment, the active material in which there is a change in stiffness in response to heating/cooling is a shape memory alloy. As long as the strain of the SMA is small such that it is deforming elastically, only a change in stiffness occurs when it is heated/cooled above/below its transition temperature. In yet another possible embodiment, an MR elastomer can undergo a change in stiffness in response to a magnetic field, and therefore, apply an effect to the seam concealment body similar to the other discussed embodiments.

In another variation of this embodiment, the seam concealment body disposed within the seam and fixedly attached to one or both surfaces comprises a shape memory alloy having a low transition temperature. This embodiment can, therefore, employ the superelastic property of the SMA. With SMA in its austenitic form at normal operating temperature stress in the SMA due to attempted movement of one or both of the surfaces will cause the SMA to change to its lower modulus Martensitic form, thereby allowing relative movement of the surfaces. Removing the stress inducing force from the surface—either by returning the surfaces to their original location or by simply removing the restraining force holding the surfaces in their new relative locations—will cause the SMA to simultaneously revert to the Austenitic form with its higher stiffness, thereby returning to its starting geometry. This embodiment utilizes the superelastic effect of the SMA.

In yet another exemplary variation of this embodiment, the seam concealment body disposed within the seam and fixedly attached to one or both surfaces of the seam can be formed from a magnetorheological elastomer. In one example, the activation signal, in this case a magnetic field, can exist on the MR elastomer causing the material to be of a higher stiffness. When movement of one surfaces with respect to the other is desired the magnetic field can be removed thereby reducing the stiffness of the MR elastomer and allowing it to be deformed by the surface movement. When the surface(s) is returned to the original starting position, the magnetic field can be reapplied to return the MR elastomer to its original higher stiffness. In an alternative second example, the magnetic field can be off under normal conditions. When the field is activated, the MR elastomer can bend or otherwise deform in such a manner so as to allow relative movement of the one or both of the surfaces that define the boundaries of the seam. Removing the magnetic field causes the MR elastomer to return the seam concealment body to its starting seam concealing shape, thereby utilizing the elastic nature of the material.

In a preferred embodiment, the change from a first stiffness to a second stiffness of the seam concealment device occurs without exposing the seam, thereby allowing the seam concealment device to function as an invisible hinge. In a further preferred embodiment, the seam concealing device is seam-spanning, i.e. creates a continuous surface with no visible seam, thereby also functioning as an invisible hinge.

In a third embodiment of the present disclosure, a seam concealment body disposed within the seam and fixedly attached to one or both surfaces comprises an active material externally attached to the seam concealment body. The seam concealment body can undergo a change (i.e., deformation) in shape upon movement of one or both of the surfaces. The externally attached active material can return the seam concealment body to its original shape (i.e., starting geometry) upon receipt of an activation signal. For example, the externally attached active material can be an SMA wire anchored to solid surface independent of the seam creating surfaces. Upon receipt of an electrical signal, the SMA wire can contract in a length dimension thereby pulling the seam concealment body back to its original seam covering shape.

The active material of the seam concealment device can be in remote operative communication with the device, or the active material can be integrated into the device. For example, the active material can be disposed on a surface of the morphable body, embedded within the surface of the morphable body, embedded within the morphable body itself, or connected externally to the surface of the seam concealment device. Moreover, the concealment device may comprise one or more active materials applied as a coating, a layer, sections such as active material strips, to at least one surface of the morphable body. Alternatively, the morphable body of the seam concealment device may be comprised completely of the active material. Further, different active materials can be applied to the surface of the morphable body, wherein the different active materials are applied adjacent to one another. In another embodiment, the active material may comprise a composite of different shape memory materials. The active material provides the concealment device with a shape changing capability that can be actively-tuned to a particular application, as will be described in greater detail below. The active materials described may have a substantially straight shape at room temperature and, a curved shape (i.e. curvilinear shape) when heated above a temperature range that may be generally encountered during vehicle operation or equipment/appliance use (in this way precluding actively controlled activation).

The active material based seam concealment device may be any of a variety of configurations, including but not limited to, a flexible flap, a rigid plate, a morphable tube, a shaped hollow cross section, and the like, wherein the configuration is suitable for concealing seams between two vehicle surfaces in the exterior or interior of the vehicle.

The active material may change at least one property in response to an activation signal, and revert back to the original state of the at least one property upon discontinuation of the activation signal, or, for the classes of active materials that do not automatically revert upon discontinuation of the activation signal, alternative means can be employed to revert the active materials to their original state. For configurations wherein the active material is activated by attempted movement of one of the surfaces, the active material may revert back to the original state of the at least one property upon returning the surface to its original physical position, i.e., activation of the active material upon opening the door, and de-activation upon closing the door. The above-listed suitable active materials for use in the concealment devices will be discussed in greater detail further below.

Coupled to and in operative communication with the active material based concealment device is an activation device, which can be linked to a control system. The activation device is operable to selectively provide an activation signal to the active material based concealment device and change a feature of the active material based concealment device by changing at least one property of the active material. For example, the active material can become more or less rigid depending on whether one pushes a button to open the hood of the vehicle. The activation device, on demand, provides the activation signal or stimulus to the active material of the active material based concealment device to cause the change in one or more feature of at least a portion of the device. In one embodiment, the change in feature generally remains for the duration of the applied activation signal. Upon discontinuation of the activation signal, the active material generally reverts to a deactivated form and returns substantially to the original at least one property, thus reverting the active material based concealment device to the original feature and/or features. Conversely, if the external force and/or load is being applied at the time of deactivation, for certain materials such as SMP the property will lock in the new desired form upon deactivation. In this manner, reversibility and multiple resets of the active material based concealment assemblies can advantageously occur.

The activation signal provided by the activation device can include a heat signal, a magnetic signal, an electrical signal, a pneumatic signal, a mechanical signal, a chemical signal, and the like, and combinations comprising at least one of the foregoing signals, with the particular activation signal dependent on the materials and/or configuration of the active material. For instance, a heat signal may be applied for changing the property of the active material fabricated from SMA and/or SMP. An electrical signal (voltage) may be applied for changing the property of the active material fabricated from EAPs and piezoceramics and piezopolymers. A magnetic field may be applied (removed or changed) for changing the property of the active material fabricated from magnetostrictive materials such as MSMA and MR elastomers or through another kind of control system.

The activation device can be operated in a variety of ways. For example, in one embodiment, use of the remote key fob to lock/unlock a vehicle door could also be configured to initiate the activation signal and cause reducing/increasing the size and/or stiffness of the seam concealing device. Likewise, a wireless signal transmitter in the key fob in combination with an activation device sensor could be used to automatically activate the active material when the key fob is brought into physical proximity to the active material based concealment device, thereby eliminating the need to press key fob buttons. In another embodiment, the activation signal could be manually activated. For example, inserting the vehicle key into the door lock or using an interior door handle could activate the activation signal. Similarly, a push button or the like could be disposed adjacent the seam, wherein depressing the push button activates the activation signal in order to change the size and/or stiffness of the seam material. In any of the above methods of activating the active material, the activation signal can be turned off by time-out of a timer in communication with the active material based concealment device, or through a sensor in operative communication with the device, or through the occurrence of some event, for example, opening and closing the vehicle door to deactivate the activation signal and return the device to its original state.

In the embodiments where attempted movement of one of the surfaces results in a change in stiffness of the seam concealing device, the change in stiffness can be the result of the superelastic property of SMA. Starting with SMA in its Austenitic form at room temperature, applying force to a first surface or a second surface and connected to the seam concealing device comprising SMA material will cause a stress induced switch of the SMA to the lower modulus Martensitic form, the lower modulus SMA then allowing relative movement of the adjacent panels through superelastic deformation of the SMA. A removal of the application of force would revert the SMA material to its original state—both geometry and stiffness.

Whatever the mode of activation, it is advantageous that the active material based seam concealment device remain in its original state when in the passive mode, i.e., when there is no power or activation signal to the device. When no movement is desirable by either one or both of the surfaces adjacent to the seam, and no activation signal is being applied to the active material, then no power is required for the continued concealment of the seam. In other words, the only power required by the active material based concealment device is for the short duration in which the device must change the property that allows for movement at the seam, such as reducing stiffness at the seam for the opening of a door in the case of a door panel.

In another embodiment, the active material based concealment device includes at least one sensor in operative communication with the device and/or the active material, wherein the sensor is adapted to transmit signals indicative of at least one vehicle condition. A vehicle condition can mean when the vehicle is parked or in motion, or when a part or accessory of the vehicle transitions between conditions, for example when a door is open or closed. This embodiment may further comprise a controller that is operatively connected to the sensor and the activation device, wherein the controller is programmed and configured to cause the activation device to provide an activation signal to the active material when the sensor signals indicate a predetermined vehicle condition or a required configuration of the two surfaces. The magnitude of the changed attribute as well as its rate of change (or profile) can be determined by the control system.

The active material may comprise any of a variety of active materials, including but not limited to shape memory materials, e.g., shape memory alloys, shape memory polymers, and electroactive polymers, polymer metal composites, conductive polymers, magnetorheological (MR) compositions, such as MR elastomers, piezoceramics, piezopolymers, and other like materials that can exhibit a change in at least one property upon receiving an activation signal. The present disclosure is not intended to be limited to any particular active material and/or combinations of active materials. Likewise, the present disclosure is not intended to be limited to any particular activation signal. The particular activation signal or combinations thereof will depend on the sensitivity of the active material, and/or the preferred method and/or the rate or level of change (or profile) of the attribute required. For instance SMA can be activated thermally using Joule (electrical resistive) heating and/or convectively using fluid heating.

To better understand the various ways in which a seam concealment device can employ active materials to reversibly conceal a seam between two surfaces, it is necessary to understand the nature and mechanics of the desirable active materials. As previously mentioned, suitable active materials for the active material based concealment devices include, without limitation, shape memory alloys ("SMAs"; e.g., thermal and stress activated shape memory alloys and magnetic shape memory alloys (MSMA)), electroactive polymers (EAPs) such as dielectric elastomers, ionic polymer metal composites (IPMC), and shape memory polymers (SMPs), shape memory ceramics (SMCs), baroplastics, magnetorheological (MR) materials (e.g., fluids and elastomers), piezoceramics, piezopolymers, composites of the foregoing active materials with non-active materials, systems comprising at least one of the foregoing active materials, and combinations comprising at least one of the foregoing active materials. For convenience and by way of example, reference herein will be made to shape memory alloys and shape memory polymers. The shape memory ceramics, baroplastics, and the like, can be employed in a similar manner. For example, with baroplastic materials, a pressure induced mixing of nanophase domains of high and low glass transition temperature (Tg) components effects the shape change. Baroplastics can be processed at relatively low temperatures repeatedly without degradation.

The ability of shape memory materials to return to their original shape upon the application or removal of external stimuli has led to their use in actuators to apply force resulting in desired motion. Active material actuators offer the potential for a reduction in actuator size, weight, volume, cost, noise and an increase in robustness in comparison with traditional electromechanical and hydraulic means of actuation. Ferromagnetic SMAs, for example, exhibit rapid dimensional changes of up to several percent in response to (and proportional to the strength of) an applied magnetic field. However, these changes are one-way changes and use the application of either a biasing force or a field reversal to return the ferromagnetic SMA to its starting configuration.

Shape memory alloys are alloy compositions with at least two different temperature-dependent phases or polarity. The most commonly utilized of these phases are the so-called martensite and austenite phases. In the following discussion, the martensite phase generally refers to the more deformable, lower temperature phase whereas the austenite phase generally refers to the more rigid, higher temperature phase. When the shape memory alloy is in the martensite phase and is heated, it begins to change into the austenite phase. The temperature at which this phenomenon starts is often referred to as austenite start temperature (As). The temperature at which this phenomenon is complete is often called the austenite finish temperature (Af). When the shape memory alloy is in the austenite phase and is cooled, it begins to change into the martensite phase, and the temperature at which this phenomenon starts is often referred to as the martensite start temperature (Ms). The temperature at which austenite finishes transforming to martensite is often called the martensite finish temperature (Mf). The range between As and Af is often referred to as the martensite-to-austenite transformation temperature range while that between Ms and Mf is often called the austenite-to-martensite transformation temperature range. It should be noted that the above-mentioned transition temperatures are functions of the stress experienced by the SMA sample. Generally, these temperatures increase with increasing stress. In view of the foregoing properties, deformation of the shape memory alloy is preferably at or below the austenite start temperature (at or below As). Subsequent heating above the austenite start temperature causes the deformed shape memory material sample to begin to revert back to its original (nonstressed) permanent shape until completion at the austenite finish temperature. Thus, a suitable activation input or signal for use with shape memory alloys is a thermal activation signal having a magnitude that is sufficient to cause the temperature-dependent transformations between the martensite and austenite phases.

The temperature at which the shape memory alloy remembers its high temperature form (i.e., its original, nonstressed shape) when heated can be adjusted by slight changes in the composition of the alloy and through thermo-mechanical processing. In nickel-titanium shape memory alloys, for example, it can be changed from above about 100° C. to below about −100° C. The shape recovery process can occur over a range of just a few degrees or exhibit a more gradual recovery over a wider temperature range. The start or finish of the transformation can be controlled to within several degrees depending on the desired application and alloy composition. The mechanical properties of the shape memory alloy vary greatly over the temperature range spanning their transformation, typically providing shape memory effect and superelastic effect. For example, in the martensite phase a lower elastic modulus than in the austenite phase is observed. Shape memory alloys in the martensite phase can undergo large deformations by realigning the crystal structure arrangement with the applied stress. The material will retain this shape after the stress is removed. In other words, stress induced phase changes in SMA are two way by nature; application of sufficient stress when an SMA is in its austenitic phase will cause it to change to its lower modulus martensitic phase. Removal of the applied stress will cause the SMA to switch back to its austenitic phase, and in so doing, recovering its starting shape and higher modulus.

Exemplary shape memory alloy materials include nickel-titanium based alloys, indium-titanium based alloys, nickel-aluminum based alloys, nickel-gallium based alloys, copper based alloys (e.g., copper-zinc alloys, copper-aluminum alloys, copper-gold, and copper-tin alloys), gold-cadmium based alloys, silver-cadmium based alloys, indium-cadmium based alloys, manganese-copper based alloys, iron-platinum based alloys, iron-palladium based alloys, and so forth. The alloys can be binary, ternary, or any higher order so long as the alloy composition exhibits a shape memory effect, e.g., change in shape, orientation, yield strength, flexural modulus, damping capacity, superelasticity, and/or similar properties. Selection of a suitable shape memory alloy composition depends, in part, on the temperature range of the intended application.

The recovery to the austenite phase at a higher temperature is accompanied by very large (compared to that needed to deform the material) stresses which can be as high as the inherent yield strength of the austenite material, sometimes up to three or more times that of the deformed martensite phase. For applications that require a large number of operating cycles, a strain of less than or equal to 10% or so of the deformed length of wire used can be obtained. MSMAs are alloys often composed of Ni—Mn—Ga, that change shape due to strain induced by a magnetic field. MSMAs have internal variants with different magnetic and crystallographic orientations. In a magnetic field, the proportions of these variants change, resulting in an overall shape change of the material. An MSMA actuator generally requires that the MSMA material be placed between coils of an electromagnet. Electric current running through the coil induces a magnetic field through the MSMA material, causing a change in shape. An exemplary MSMA can be a Ni—Mn—Ga foam. The MSMA foam can have a bamboo-like grain structure that can lengthen (i.e., strain) up to about 10% when the magnetic field is applied. The foam material retains its new strained shape when the field is removed, but the magnetically sensitive atomic structure can return to its original shape if the field is rotated 90 degrees. The porous nature of the foam amplifies the shape-change effect. The Ni—Mn—Ga MSMA foam can be created by pouring the molten alloy into a piece of sodium aluminate salt. When the material is cooled, acid can be applied to leach out the salt, leaving behind large voids and thereby creating the foam-like structure.

As previously mentioned, other exemplary shape memory materials are shape memory polymers (SMPs). "Shape memory polymer" generally refers to a polymeric material, which exhibits a change in a property, such as a modulus, a dimension, a coefficient of thermal expansion, the permeability to moisture, an optical property (e.g., transmissivity), or a combination comprising at least one of the foregoing properties in combination with a change in its microstructure and/or morphology upon application of an activation signal. Shape memory polymers can be thermoresponsive (i.e., the change in the property is caused by a thermal activation signal delivered either directly via heat supply or removal, or indirectly via a vibration of a frequency that is appropriate to excite high amplitude vibrations at the molecular level which lead to internal generation of heat), photoresponsive (i.e., the change in the property is caused by an electromagnetic radiation activation signal), moisture-responsive (i.e., the change in the property is caused by a liquid activation signal such as humidity, water vapor, or water), chemo-responsive (i.e. responsive to a change in the concentration of one or more chemical species in its environment; e.g., the concentration of H+ion– the pH of the environment), or a combination comprising at least one of the foregoing.

Generally, SMPs are phase segregated co-polymers comprising at least two different units, which can be described as defining different segments within the SMP, each segment contributing differently to the overall properties of the SMP. As used herein, the term "segment" refers to a block, graft, or sequence of the same or similar monomer or oligomer units, which are copolymerized to form the SMP. Each segment can be (semi-)crystalline or amorphous and will have a corresponding melting point or glass transition temperature (Tg), respectively. The term "thermal transition temperature" is used herein for convenience to generically refer to either a Tg or a melting point depending on whether the segment is an amorphous segment or a crystalline segment. For SMPs comprising (n) segments, the SMP is said to have a hard segment and (n−1) soft segments, wherein the hard segment has a higher thermal transition temperature than any soft segment. Thus, the SMP has (n) thermal transition temperatures. The thermal transition temperature of the hard segment is termed the "last transition temperature", and the lowest thermal transition temperature of the so-called "softest" segment is termed the "first transition temperature". It is important to note that if the SMP has multiple segments characterized by the same thermal transition temperature, which is also the last transition temperature, then the SMP is said to have multiple hard segments.

When the SMP is heated above the last transition temperature, the SMP material can be imparted a permanent shape. A permanent shape for the SMP can be set or memorized by subsequently cooling the SMP below that temperature. As used herein, the terms "original shape", "previously defined shape", "predetermined shape", and "permanent shape" are synonymous and are intended to be used interchangeably. A temporary shape can be set by heating the material to a temperature higher than a thermal transition temperature of any soft segment yet below the last transition temperature, applying an external stress or load to deform the SMP, and then cooling below the particular thermal transition temperature of the soft segment while maintaining the deforming external stress or load.

The permanent shape can be recovered by heating the material, with the stress or load removed, above the particular thermal transition temperature of the soft segment yet below the last transition temperature. Thus, it should be clear that by combining multiple soft segments it is possible to demonstrate multiple temporary shapes and with multiple hard segments it can be possible to demonstrate multiple permanent shapes. Similarly using a layered or composite approach, a combination of multiple SMPs will demonstrate transitions between multiple temporary and permanent shapes.

MR fluids are a class of smart materials whose theological properties can rapidly change upon application of a magnetic field (e.g., property changes of several hundred percent can be effected within milliseconds), making them quite suitable in locking in (constraining) or allowing the relaxation of shapes/deformations through a significant change in their shear strength, such changes being usefully employed with grasping and release of objects in embodiments described herein. Exemplary shape memory materials also comprise magnetorheological (MR) and ER polymers. MR polymers are suspensions of micrometer-sized, magnetically polarizable particles (e.g., ferromagnetic or paramagnetic particles as described below) in a polymer (e.g., a thermoset elastic polymer or rubber). Exemplary polymer matrices include poly-alpha-olefins, natural rubber, silicone, polybutadiene, polyethylene, polyisoprene, and combinations comprising at least one of the foregoing.

The stiffness and, potentially, the shape of the polymer structure are attained by changing the shear and compression/tension moduli through varying the strength of the applied magnetic field. The MR polymers typically develop their stiffness when exposed to a magnetic field in as little as a few milliseconds, with the stiffness and shape changes being proportional to the strength of the applied field. Discontinuing the exposure of the MR polymers to the magnetic field reverses the process and the elastomer returns to its lower modulus state.

MR fluids exhibit a shear strength which is proportional to the magnitude of an applied magnetic field, wherein property changes of several hundred percent can be effected within milliseconds. Although these materials also face the issues packaging of the coils necessary to generate the applied field, they can be used as a locking or release mechanism, for example, for spring based grasping/releasing.

Suitable MR fluid materials include ferromagnetic or paramagnetic particles dispersed in a carrier, e.g., in an amount of about 5.0 volume percent (vol %) to about 50 vol % based upon a total volume of MR composition. Suitable particles include iron; iron oxides (including $Fe_2O_3$ and $Fe_3O_4$); iron nitride; iron carbide; carbonyl iron; nickel; cobalt; chromium dioxide; and combinations comprising at least one of the foregoing; e.g., nickel alloys; cobalt alloys; iron alloys such as stainless steel, silicon steel, as well as others including aluminum, silicon, cobalt, nickel, vanadium, molybdenum, chromium, tungsten, manganese and/or copper.

The particle size should be selected so that the particles exhibit multiple magnetic domain characteristics when subjected to a magnetic field. Particle diameters (e.g., as measured along a major axis of the particle) can be less than or equal to about 1,000 micrometers (μm) (e.g., about 0.1 micrometer to about 1,000 micrometers), or, more specifically, about 0.5 to about 500 micrometers, and more specifically, about 1 to about 100 micrometers.

The viscosity of the carrier can be less than or equal to about 100,000 centipoise (cPs) (e.g., about 1 cPs to about 100,000 cPs), or, more specifically, about 250 cPs to about 10,000 cPs, or, even more specifically, about 500 cPs to about 1,000 centipoise. Possible carriers (e.g., carrier fluids) include organic liquids, especially non-polar organic liquids. Examples include oils (e.g., silicon oils, mineral oils, paraffin oils, white oils, hydraulic oils, transformer oils, and synthetic hydrocarbon oils (e.g., unsaturated and/or saturated)); halogenated organic liquids (such as chlorinated hydrocarbons, halogenated paraffins, perfluorinated polyethers and fluorinated hydrocarbons); diesters; polyoxyalkylenes; silicones (e.g., fluorinated silicones); cyanoalkyl siloxanes; glycols; and combinations comprising at least one of the foregoing carriers.

Aqueous carriers can also be used, especially those comprising hydrophilic mineral clays such as bentonite or hectorite. The aqueous carrier can comprise water or water comprising a polar, water-miscible organic solvent (e.g., methanol, ethanol, propanol, dimethyl sulfoxide, dimethyl formamide, ethylene carbonate, propylene carbonate, acetone, tetrahydrofuran, diethyl ether, ethylene glycol, propylene glycol, and the like), as well as combinations comprising at least one of the foregoing carriers. The amount of polar organic solvent in the carrier can be less than or equal to about 5.0 vol % (e.g., about 0.1 vol % to about 5.0 vol %), based upon a total volume of the MR fluid, or, more specifically, about 1.0 vol % to about 3.0%. The pH of the aqueous carrier can be less than or equal to about 13 (e.g., about 5.0 to about 13), or, more specifically, about 8.0 to about 9.0.

When the aqueous carriers comprises natural and/or synthetic bentonite and/or hectorite, the amount of clay (bentonite and/or hectorite) in the MR fluid can be less than or equal to about 10 percent by weight (wt %) based upon a total weight of the MR fluid, or, more specifically, about 0.1 wt % to about 8.0 wt %, or, more specifically, about 1.0 wt % to about 6.0 wt %, or, even more specifically, about 2.0 wt % to about 6.0 wt %.

Optional components in the MR fluid include clays (e.g., organoclays), carboxylate soaps, dispersants, corrosion inhibitors, lubricants, anti-wear additives, antioxidants, thixotropic agents, and/or suspension agents. Carboxylate soaps include ferrous oleate, ferrous naphthenate, ferrous stearate, aluminum di- and tri-stearate, lithium stearate, calcium stearate, zinc stearate, and/or sodium stearate; surfactants (such as sulfonates, phosphate esters, stearic acid, glycerol monooleate, sorbitan sesquioleate, laurates, fatty acids, fatty alcohols, fluoroaliphatic polymeric esters); and coupling agents (such as titanate, aluminate, and zirconate); as well as combinations comprising at least one of the foregoing. Polyalkylene diols, such as polyethylene glycol, and partially esterified polyols can also be included.

Electronic electroactive polymers (EAPs) are a laminate of a pair of electrodes with an intermediate layer of low elastic modulus dielectric material. Applying a potential between the electrodes squeezes the intermediate layer causing it to expand in plane. They exhibit a response proportional to the applied field and can be actuated at high frequencies. EAP morphing laminate sheets have been demonstrated. Their major downside is that they require applied voltages approximately three orders of magnitude greater than those required by piezoelectrics. Electroactive polymers include those polymeric materials that exhibit piezoelectric, pyroelectric, or electrostrictive properties in response to electrical or mechanical fields.

Materials suitable for use as an electroactive polymer may include any substantially insulating polymer and/or rubber that deforms in response to an electrostatic force or whose deformation results in a change in electric field. Exemplary materials suitable for use as a pre-strained polymer include silicone elastomers, acrylic elastomers, polyurethanes, thermoplastic elastomers, copolymers comprising PVDF, pressure-sensitive adhesives, fluoroelastomers, polymers comprising silicone and acrylic moieties (e.g., copolymers comprising silicone and acrylic moieties, polymer blends comprising a silicone elastomer and an acrylic elastomer, and so forth).

Materials used as an electroactive polymer can be selected based on material property(ies) such as a high electrical breakdown strength, a low modulus of elasticity (e.g., for large or small deformations), a high dielectric constant, and so forth. In one embodiment, the polymer can be selected such that is has an elastic modulus of less than or equal to about 100 MPa. In another embodiment, the polymer can be selected such that is has a maximum actuation pressure of about 0.05 megaPascals (MPa) and about 10 MPa, or, more specifically, about 0.3 MPa to about 3 MPa. In another embodiment, the polymer can be selected such that is has a dielectric constant of about 2 and about 20, or, more specifically, about 2.5 and about 12. The present disclosure is not intended to be limited to these ranges. Ideally, materials with a higher dielectric constant than the ranges given above would be desirable if the materials had both a high dielectric constant and a high dielectric strength. In many cases, electroactive polymers can be fabricated and implemented as thin films, e.g., having a thickness of less than or equal to about 50 micrometers.

As electroactive polymers may deflect at high strains, electrodes attached to the polymers should also deflect without compromising mechanical or electrical performance. Generally, electrodes suitable for use can be of any shape and material provided that they are able to supply a suitable voltage to, or receive a suitable voltage from, an electroactive polymer. The voltage can be either constant or varying with time. In one embodiment, the electrodes adhere to a surface of the polymer. Electrodes adhering to the polymer can be compliant and conform to the changing shape of the polymer. The electrodes can be only applied to a portion of an electroactive polymer and define an active area according to their geometry. Various types of electrodes include structured electrodes comprising metal traces and charge distribution layers, textured electrodes conductive greases (such as carbon greases and silver greases), colloidal suspensions, high aspect ratio conductive materials (such as carbon nanotubes, and mixtures of ionically conductive materials), as well as combinations comprising at least one of the foregoing.

Exemplary electrode materials can include graphite, carbon black, colloidal suspensions, metals (including silver and gold), filled gels and polymers (e.g., silver filled and carbon filled gels and polymers), and ionically or electronically conductive polymers, as well as combinations comprising at least one of the foregoing. It is understood that certain electrode materials may work well with particular polymers and may not work as well for others. By way of example, carbon fibrils work well with acrylic elastomer polymers while not as well with silicone polymers.

Magnetostrictives are solids that develop a large mechanical deformation when subjected to an external magnetic field. This magnetostriction phenomenon is attributed to the rotations of small magnetic domains in the materials, which are randomly oriented when the material is not exposed to a magnetic field. The shape change is largest in ferromagnetic or ferromagnetic solids. These materials possess a very fast response capability, with the strain proportional to the strength of the applied magnetic field, and they return to their starting dimension upon removal of the field. However, these materials have maximum strains of about 0.1 to about 0.2 percent.

Referring now to FIGS. 1a and 1b, an exemplary embodiment of an active material based seam concealment device and generally designated by reference numeral 12. In this embodiment, the device 12 comprises the seam concealment body 17, overlaps and is directly connected to the substantially co-planar abutting surfaces, such as the first surface 4 and/or the second surface 8 and partially fills the seam 6. Seam concealment body 17 has a body surface 9 that is substantially co-planar with a portion of the first surface 4 and a portion of the second surface 8. In another example, rather than partially or completely fill the seam 6, the seam concealment body 17 can cover the seam 6 by overlapping the edges of each of the first surface 4 and the second surface 8 forming the seam 6. The device 12 can still function in the same manner; the only difference is the location of the concealment body 17. The seam concealment body 17 comprises an active material 2. The active material 2, which can completely comprise the body 17 or merely comprise intermittent strips or the like within the body 17 is configured to undergo a change in at least one property upon receipt of an activation signal, wherein the change in a property is effective to transition the seam concealment body 17 between a first shape (FIG. 1a) and a second shape (FIG. 1b). Movement of the active material 2 (as shown in FIG. 1(b)) will deform the seam concealment body 17 from the first shape to the second shape. Activation of the active material 2 within the body 17 can be effective to return the body from the second shape back to the first shape. In one embodiment, the transition between the first shape and the second shape permits movement of a selected one or both of the first surface 4 and the second surface 8 such that the seam concealment body 17 forms a hinge 30. In one variation of this embodiment, the active material 2 can be a shape memory alloy. The seam concealment body 17 of this embodiment is advantageous for concealing seams 6 where surface aesthetics may be important, such as between the exterior body panels of a vehicle. The seam concealment body 17 can be painted and/or shaped to resemble the surrounding first surface 4 and second surface 8. The change in shape of the seam concealment body 17 can be a reduction or expansion in size, volume, length, or other physical dimension such that would allow for freedom of movement of the adjacent surfaces, and/or reversibly restrict movement of adjacent surfaces.

An activation device 11 can be used to supply the activation signal to the active material 2. Likewise, a controller 13 and a sensor 14 can be used in operative communication with the activation device 11 so that each component functions with each other and the active material based seam concealment body 12 to initiate changes in at least one property of the active material.

Figure 2A:
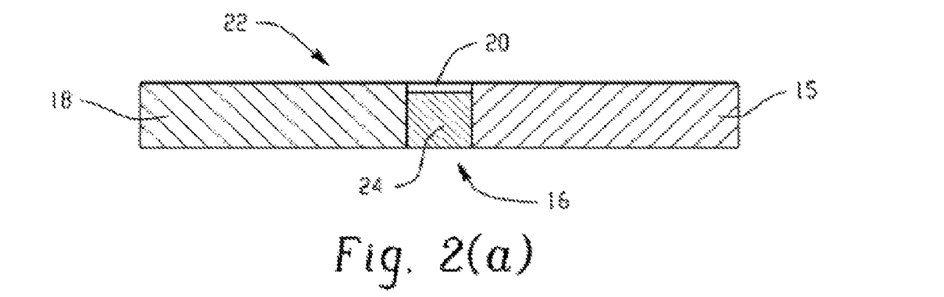
Figure 2B:
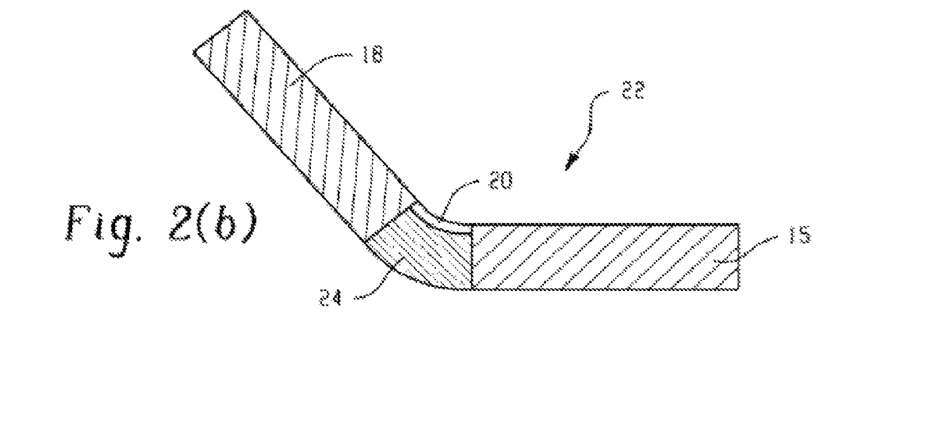

Referring to FIG. 2, another exemplary embodiment of seam concealment body is illustrated and generally designated by reference numeral 22. In this embodiment, the seam concealment body 22 is seated within seam 16 and directly connected to one of the abutting surfaces, such as surface 15. The seam concealment body 22 comprises an active material 24. The active material, which can completely comprise the body 22 or merely comprise intermittent strips or the like within the body 22 is configured to undergo a change in at least one property upon receipt of an activation signal, wherein the change in a property is effective to transition the seam concealment body 22 between a first stiffness (a) and a second stiffness (b), which allows for movement of the surface 18.

In one variation of this embodiment, the seam concealment body can further include a second body 20, which may or may not be formed of active material. The seam concealment body 22 can be the connecting material in which case it is connected to the second body 20, such that the second body 20 is the visible material concealing the seam 16. The second body 20 is advantageous for concealing seams where surface aesthetics may be important, such as between the exterior body panels of a vehicle. In this case, the second body 20 can be formed of a material that can be more easily painted and/or shaped to resemble the surrounding first and second surfaces, than the active material employed.

In one example of the above embodiment, the seam concealment body 22 can comprise an SMP. The SMP can be softened to a second stiffness via application of a heat signal to permit movement of the surface 18. After the surface 18 is returned to its original position, with the heat signal still on the body 22 will return to its original shape and then the heat signal can be removed from the SMP which thus causes the SMP to return to the first stiffness. In another embodiment, the seam concealment body 22 can comprise an MR elastomer and/or and MR fluid. The MR elastomer/fluid can be softened to the second stiffness via by the removal of a magnetic field that lowers stiffness and/or shear strength of the seam concealment body in so doing allowing relative movement of the abutting surfaces. Application of the magnetic field can return the MR elastomer/fluid to its original seam concealing stiffness after one or more of the surfaces are returned to their starting positions.

Figure 3A:
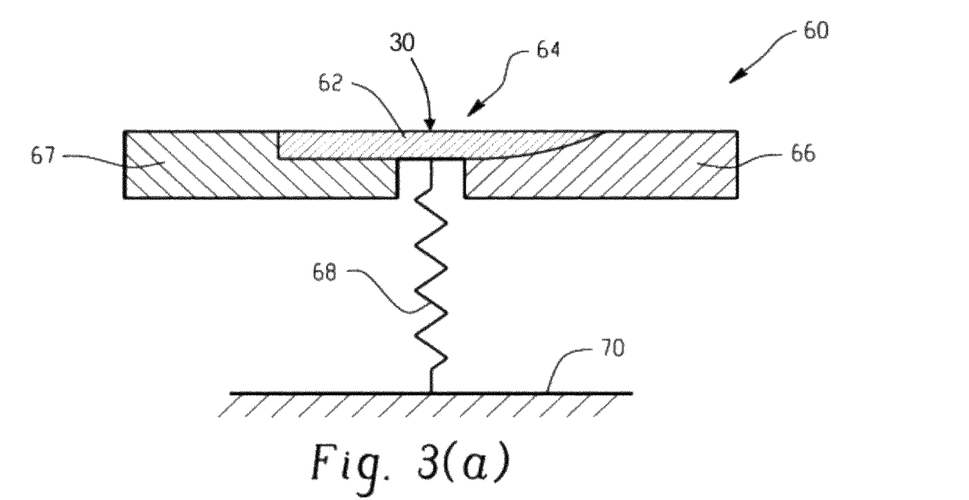
Figure 3B:
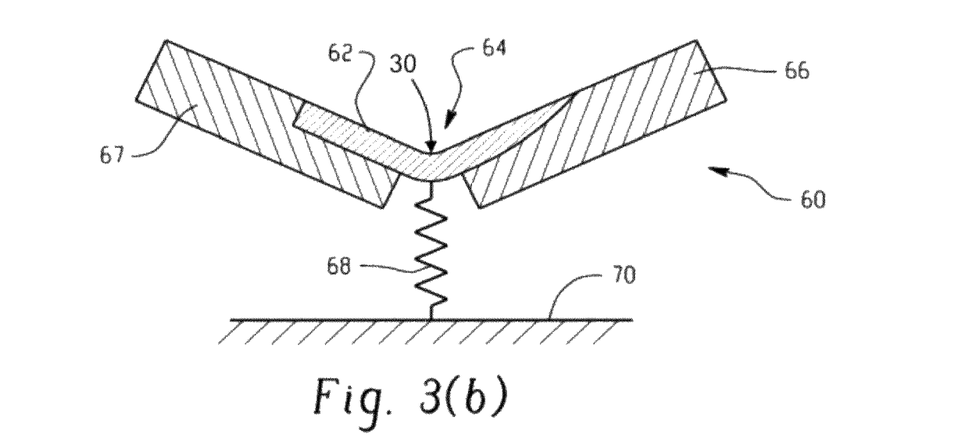

In an alternate embodiment, shown in FIG. 3, an active material based concealment device is generally designated by reference numeral 60. In this embodiment, the seam concealment body 62 is seated within a seam 64 and directly connected to both abutting surfaces 66 and 67. An active material 68 is externally connected to the seam concealment body 62. In one embodiment, the active material 68 comprises an SMA wire fixedly attached between the body 62 and a solid surface 70. As used herein, the term "wire" is generally intended to mean any geometric form suitable for attaching between the body 62 and the surface 70. Examples include, without limitation, cable, strip, spring, and other like geometric shapes. The SMA wire 68 is configured to undergo a change in a length dimension upon receipt of an activation signal. Upon movement of one or both of the surfaces 66 and 67, the body 62 is deformed from a first shape to a second shape in so doing stretching or otherwise deforming the SMA wire 68. Activation of the SMA wire 68 can return the seam concealment body 62 to its original shape (i.e., starting geometry) upon receipt of an activation signal. The SMA wire, which is anchored to the solid surface 70, can contract in a length dimension upon receipt of an electrical signal, thereby pulling the seam concealment body back to its original seam covering shape.

For embodiments shown in FIGS. 1, 2, and 3, the seam concealment body can be designed to respond to attempted movement of one or both of the surfaces, allowing it to be deformed during subsequent further movement of one or both of the surfaces.

In yet another exemplary embodiment, the change in at least one property of the active material body may be reversed such that heating is required to allow for movement of one or both surfaces at the seam and reversion to low temperature will cause immobility at the seam. In either case, the change in at least one property of the active material body may remain upon discontinuing the activation signal. Further, the active material based concealment device can be restored and healed to a desired shape by heating the active material body to the appropriate temperature. In this manner, an active material based concealment device that becomes inadvertently deformed, such as during an impact event, may be restored or healed to a desired shape by applying the appropriate temperature range. The selection of material comprising the active material body will be determined by the desired application and will be known to those skilled in the art.

Figure 4:
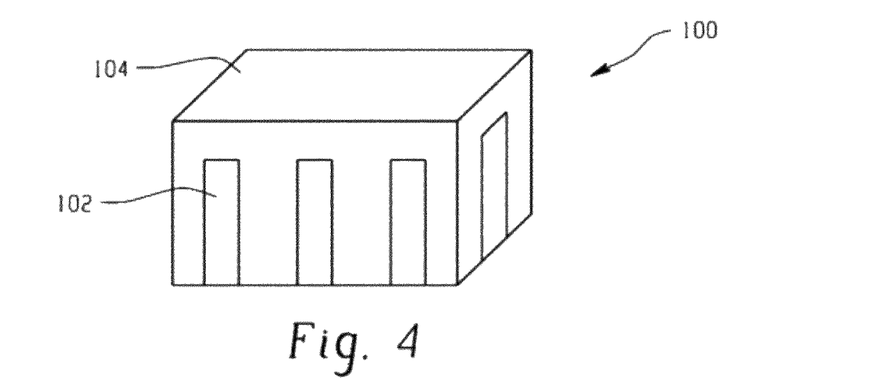
FIG. 4 is a perspective view of an active material based concealment device wherein the active material comprises sections embedded in the morphable body.

In FIG. 4, an alternative embodiment of a seam concealment body 100 is shown, wherein the body includes strips and/or sections of active material embedded on a surface. The active material strips 102 are embedded, preferably but not necessarily at regular intervals, on the surface of a flexible matrix 104. In an alternate embodiment, the active material strips are embedded within the elastic matrix of the seam concealment body. The placement of the active material is not limited to any particular configuration or pattern and will be determined by the desired application of the device. In one embodiment, the active material strips 102 are strips of SMA, wherein the active material strips 102 have a trained curved shape in the austenite phase (not shown in the FIG. 3 view). Again, the change in shape of the active material may be initiated by an activation signal transmitted by an activation device, controller, sensor, and/or by attempted movement of at least one adjacent surface.

As a result of the change in phase, the stiffness of the SMA active material strips 102 in the austenite phase will be greater than the stiffness in the martensite phase. The number and size of the embedded active material strips 102 may be chosen such that when in the austenite phase the embedded active material causes the bulk of the active material based concealment device 100 to deform. However, when the SMA active material strips 102 are in the martensite phase, the flexible matrix 104 of the active material based concealment device 100 is sufficiently stiff to return the device to a straight configuration, and in doing so, straightening the SMA active material strips 102. As previously discussed, the active material based concealment device 100 may be restored if deformed as a result of force, such as an impact or other event causing plastic deformation, by heating the SMA active material strips 102 to the austenite phase temperature.

The application and functionality of the active material based concealment device will determine which active material is best suited for the particular assembly. Factors such as force, displacement, actuation time, and the like can be used to determine which type of active material is most appropriate. For instance, where an application requires an activation time of about 1 second or greater, an SMA or SMP can be appropriate. Where an application requires shorter activation times, an EAP or MR elastomer can be used.

As stated above, the concealment devices as disclosed herein advantageously employ active materials to reversibly change the size and/or stiffness of seam material seated between two adjacent surfaces to allow for relative movement of the surfaces. The active material based concealment devices are lightweight, inherently robust, lower in complexity than existing seam concealment devices (which can have multiple mechanical and/or electrical components prone to failure), and produce little or no noise. Utilizing active materials to affect the shape and/or stiffness of the devices provides them with increased simplicity, while reducing assembly volume and the energy requirements for activation due to their higher energy densities. Moreover, the active material based concealment devices described herein are also low-cost and of easily adaptable design that can be integrated with limited changes to the existing structure.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A device for concealing a seam between a first surface and a second surface, the device comprising:
   a seam concealment body having a body surface, the seam concealment body overlaying and attached to a first surface and a second surface, the body surface being substantially co-planar with a portion of the first surface and a portion of the second surface, the seam concealment body configured to transition between a first shape and a second shape, wherein the transition between the first and the second shape permits movement of a selected one or both of the first surface and the second surface such that the seam concealment body forms a hinge; and
   an active material in operative communication with the seam concealment body, wherein the active material is configured to undergo a change in at least one property upon receipt of an activation signal, wherein the change in at least one property is effective to transition the seam body from the first shape to the second shape.

2. The device of claim 1, wherein the active material is disposed within the seam concealment body.

3. The device of claim 1, wherein the active material comprises a shape memory alloy, a ferromagnetic shape memory alloy, a shape memory polymer, an magnetorheological elastomer, a piezoceramic, or combinations comprising at least one of the foregoing active materials.

4. The device of claim 1, wherein the change in the at least one property comprises a change in a shape, a dimension, a phase, a shape orientation, a stiffness, or combinations comprising at least one of the foregoing properties.

5. The device of claim 1, wherein the active material is a shape memory alloy and the change in at least one property is a stress-induced superelasticity effective to allow reversal of the transition of the first shape to the second shape of the seam concealment body.

6. The device of claim 1, wherein the activation signal comprises a thermal activation signal, an electric activation signal, a magnetic activation signal, a chemical activation signal, a mechanical load, or a combination comprising at least one of the foregoing activation signals.

7. The device of claim 1, wherein one of the first surface and the second surface comprises an interior or an exterior surface of a vehicle.

8. The device of claim 1, wherein the respective one of the first or the second surface comprises a door panel, trunk lid, hood, window, tailgate, sunroof, moon roof, center console, storage compartment, or glove box.

* * * * *